No. 703,556. Patented July 1, 1902.
J. J. DANIELS.
TRAP FOR POCKET GOPHERS.
(Application filed Sept. 21, 1901.)
(No Model.)
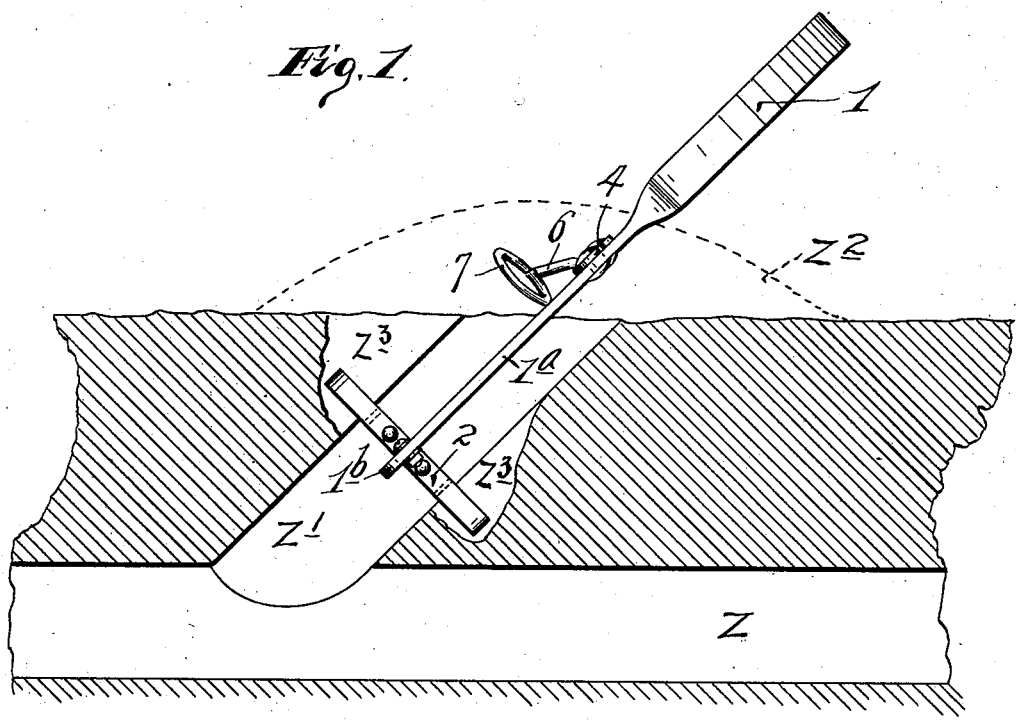
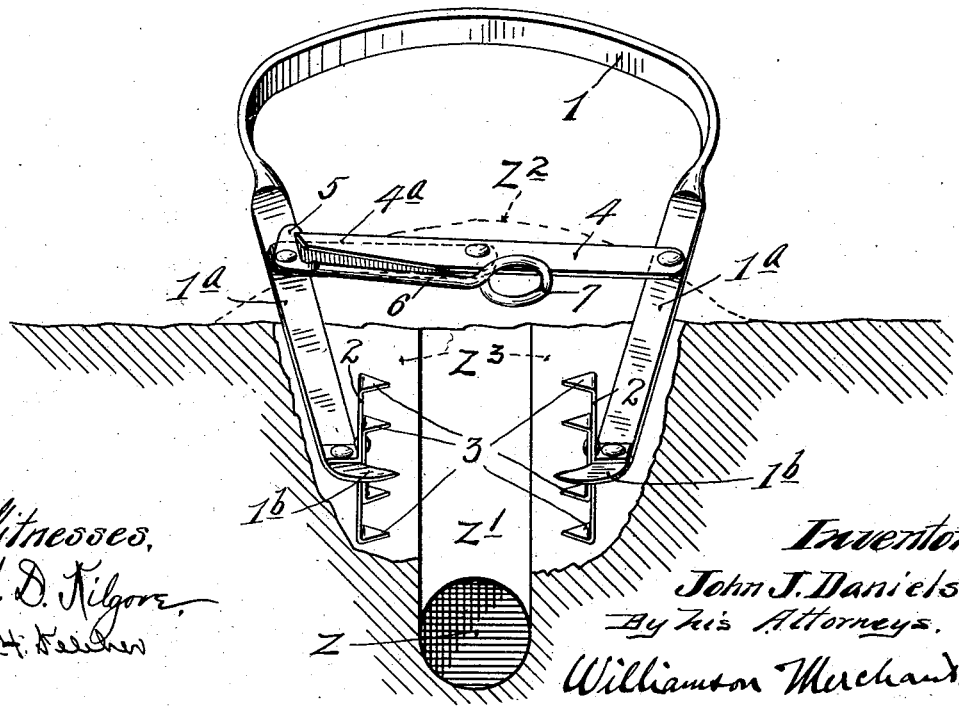
Witnesses,
H. D. Kilgore
C. H. Keener
Inventor:
John J. Daniels.
By his Attorneys,
Williamson Merchant

UNITED STATES PATENT OFFICE.

JOHN J. DANIELS, OF NEW LONDON, MINNESOTA.

TRAP FOR POCKET-GOPHERS.

SPECIFICATION forming part of Letters Patent No. 703,556, dated July 1, 1902.

Application filed September 21, 1901. Serial No. 76,029. (No model.)

*To all whom it may concern:*

Be it known that I, JOHN J. DANIELS, a citizen of the United States, residing at New London, in the county of Kandiyohi and State of Minnesota, have invented certain new and useful Improvements in Traps for Pocket-Gophers; and I do hereby declare the following to be a full, clear, and exact description of the invention, such as will enable others skilled in the art to which it appertains to make and use the same.

My invention has for its object to provide a simple and efficient trap especially adapted for use in catching pocket-gophers; and to this end it consists of the novel devices and combinations of devices hereinafter described, and defined in the claims. As is a well-known fact these pocket-gophers burrow under the ground and at intervals come to the surface and deposit quite large hills of dirt. In meadows this is very annoying, as the hills of dirt interfere with mowing. In cultivated ground these gophers loosen the dirt and tear up roots and, furthermore, are very destructive to crops in that they eat the roots of growing vegetation.

In accordance with my invention I provide a spring-trap which is adapted to be set and partially embedded in the earth, with its toothed jaws embracing the surface branch of the gopher-hole and with its trigger so located that the trap will be sprung whenever the gopher comes into contact therewith or presses dirt against the same.

The invention is illustrated in the accompanying drawings, wherein like characters indicate like parts throughout both views.

Figure 1 shows the trap in side elevation and a portion of the ground and gopher-hole in section. Fig. 2 shows the trap in perspective and the ground and gopher-hole in transverse section.

The numeral 1 indicates a strong approximately U-shaped spring, the tension of which tends to throw its free ends together with a very considerable force. At its free ends the said spring member 1 is provided with transversely-extended and opposing heads 2, which have a plurality of sharp teeth 3. For a considerable length inward of its free ends the said spring member 1 is formed with rigid arm-sections $1^a$, and at its extreme end it is shown as provided with integrally-formed and inturned barbs $1^b$. The prongs of the spring member 1 are adapted to be held separated by a toggle-link 4, the ends of which are pivoted to the rigid arm-sections $1^a$. One member of the toggle-link 4 is provided with an extended trip-arm $4^a$, the free end of which, as shown, terminates near one of one pivoted end of the toggle. For coöperation with the arm $4^a$ I provide a trigger which is pivoted, as shown, to one of the end pivots of the toggle 4. This trigger involves a detent 5 and a rod 6, the former of which when engaged with the free end of the arm $4^a$ holds the toggle 4 close, but not quite to its dead-center, against the tension of the spring 1. At its free end the trip-rod 6 is provided with a head 7, against which the dirt is adapted to be packed to trip the trap.

$z$ indicates the main line of the gopher-hole, and $z'$ indicates one of the surface branches which usually runs to the surface from the main line approximately as indicated in Fig. 1. The hill formed at the upper extremity of the branch $z'$ will usually take substantially the form indicated by the dotted lines $z^2$ in Fig. 1.

The trap is applied by opening the hole substantially as indicated at $z^3$, so that the spread or separated jaws 2 are caused to embrace the branch $z'$ substantially as indicated in the drawings.

It is a known fact that whenever one of the branches $z$ is opened up the gopher will return and close the same by pushing dirt ahead of him into the upper end of the said branch. In doing this dirt is pressed against the head 7 of the trigger-rod 6 and the trap is sprung, so that the gopher will be caught between the toothed jaws of the trap.

In some cases the gopher will simply run his nose against the trigger as he emerges from the hole, in which case the trap will of course be sprung and will catch the gopher, as above described.

The trap above described by actual use has proven to be extremely efficient for the purposes had in view. Furthermore, it is of small cost and has no parts which are liable to get out of order. It is of course capable of considerable modification within the scope of my invention. Hence it is of course obvious that the jaws at the free ends of the spring-pressed arm may have any desired number of barbs or points. It is also evident that the arms 1ª might be constructed separately and can be secured detachably or otherwise to the spring 1. The construction shown, however, has advantages over such modification.

What I claim, and desire to secure by Letters Patent of the United States, is as follows:

1. A trap comprising the spring 1 with arms 1ª and jaws 2 secured to the free ends of said arms 1ª, the toggle 4 for holding said jaws separated, one of said toggle members having the extended arm 4ª, and a device applicable to the arm 4ª for holding the trap set and releasing the same.

2. A trap comprising the spring 1 with arms 1ª, the toothed jaws 2 secured to the free ends of said arms 1ª and extending transversely thereof, the toggle 4 for holding said jaws separated, one of the toggle members having an arm 4ª, and the pivoted trigger 6 having the detent 5, which latter engages said arm 4ª and is adapted to be released therefrom by pressure on said trigger, substantially as described.

In testimony whereof I affix my signature in presence of two witnesses.

JOHN J. DANIELS.

Witnesses:
ELIZABETH KELIHER,
F. D. MERCHANT.